T. E. MURRAY.
SHEET METAL ROD OR SHAFT.
APPLICATION FILED DEC. 14, 1916.

1,223,090.

Patented Apr. 17, 1917.

Inventor
Thomas E. Murray
By his Attorney

UNITED STATES PATENT OFFICE.

THOMAS E. MURRAY, OF NEW YORK, N. Y.

SHEET-METAL ROD OR SHAFT.

1,223,090.

Specification of Letters Patent.    Patented Apr. 17, 1917.

Application filed December 14, 1916.   Serial No. 136,857.

*To all whom it may concern:*

Be it known that I, THOMAS E. MURRAY, a citizen of the United States, residing at New York, in the county of New York and State of New York, have invented a certain new and useful Improvement in Sheet-Metal Rods or Shafts, of which the following is a specification.

The invention is a rod or shaft built up of successive sections of struck up sheet metal united by electrically welded joints. The object is to produce a very light and strong rod or shaft which may be used without machining, for any purpose for which rods or shafts otherwise constructed may be employed.

In the accompanying drawings—

Figure 1:
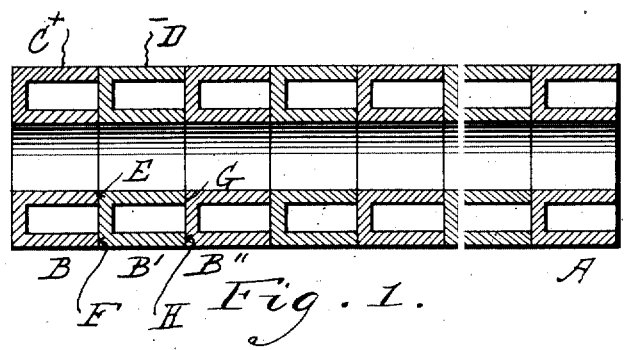
Figure 2:
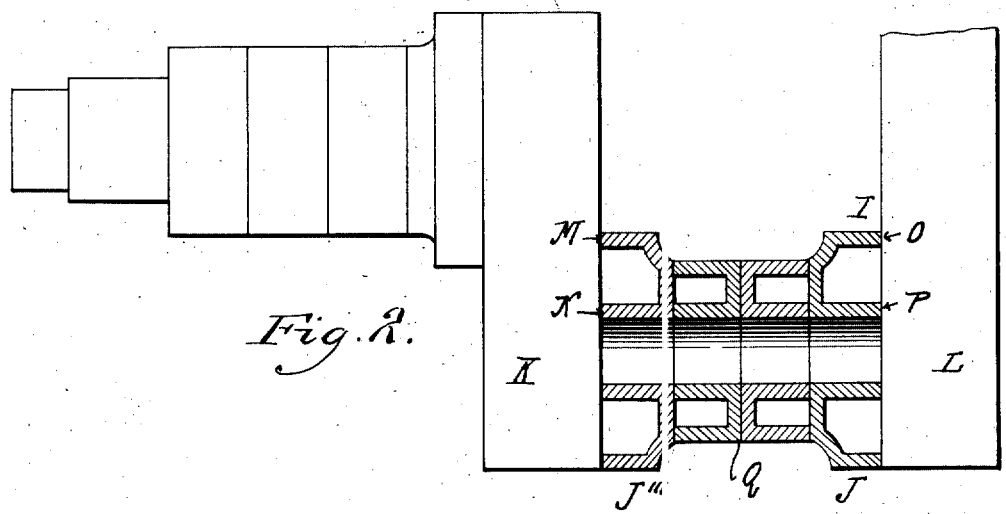

Figure 1 represents my rod or shaft in longitudinal section. Fig. 2 shows a crank, the shaft and pin of which are constructed in accordance with my invention.

Similar letters of reference indicate like parts.

The shaft A is formed of a series of channeled rings placed in succession. As shown in Fig. 1, the edges of the wall of one ring are in contact with the flat annular face of the adjacent ring. In constructing this shaft, I first place two rings, as B, B', together, and connect to said rings, respectively, terminals C, D from any suitable source of welding current. In this way, I produce electrically welded joints at E, F, between the edges of the walls of ring B and the face of ring B'. I may then add a third ring B'', and by connecting the circuit terminals to said ring and to ring B', I make welded joints between ring B'' and ring B' at G, H. In this way, I continue adding rings and electrically welding them in place until a shaft of desired length is obtained. As shown in Fig. 1, the rings B, B', etc., are all of like diameter, and therefore a shaft everywhere of uniform diameter may be formed from such rings.

Where the shaft is to be flanged, or enlarged at its end for attachment to some other object, I may enlarge the diameter of the outer wall of the end ring. Thus in Fig. 2 a crank pin has the outer walls of its end rings J, J''' enlarged in diameter and electrically welded to crank arms K, L at M, N, O, P.

Instead of placing the rings with the edges of one ring against the face of the next ring, as shown in Fig. 1, I may arrange the rings in pairs, with their faces in contact and electrically welded, as shown at Q in Fig. 2.

I claim:

1. A rod or shaft of uniform diameter formed of a plurality of channeled rings of sheet metal and of like diameter struck up sheet metal and of like diameter placed successively and united by electrically welded surfaces.

2. A rod or shaft as in claim 1, in combination with a ring at the end of said shaft having its outer wall of a diameter greater than that of its inner wall.

In testimony whereof I have affixed my signature in presence of two witnesses.

THOMAS E. MURRAY.

Witnesses:
 GERTRUDE T. PORTER,
 MAY T. McGARRY.